(12) United States Patent
Fullerton et al.

(10) Patent No.: US 7,425,377 B2
(45) Date of Patent: Sep. 16, 2008

(54) INCOHERENTLY-REVERSING MAGNETIC LAMINATE WITH EXCHANGE COUPLED FERROMAGNETIC LAYERS

(75) Inventors: Eric Edward Fullerton, Morgan Hill, CA (US); Hoa Van Do, Fremont, CA (US); David Thomas Margulies, Los Gatos, CA (US); Natacha Supper, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 539 days.

(21) Appl. No.: 11/051,536

(22) Filed: Feb. 4, 2005

(65) Prior Publication Data

US 2006/0177700 A1    Aug. 10, 2006

(51) Int. Cl.
*G11B 5/66* (2006.01)

(52) U.S. Cl. ............... 428/828; 428/829; 428/830; 428/216; 360/131

(58) Field of Classification Search .............. None
See application file for complete search history.

(56) References Cited

U.S. PATENT DOCUMENTS

| | | | | |
|---|---|---|---|---|
| 5,176,965 | A | 1/1993 | Mallary | 428/694 |
| 5,431,969 | A | 7/1995 | Mallary | 427/599 |
| 5,736,235 | A | 4/1998 | Matsuda et al. | 428/212 |
| 5,738,945 | A | 4/1998 | Lal et al. | 428/611 |
| 5,759,681 | A | 6/1998 | Hosoe et al. | 428/332 |
| 5,861,220 | A | 1/1999 | Coughlin | 428/694 |
| 6,007,924 | A | 12/1999 | Lal et al. | 428/611 |
| 6,043,947 | A * | 3/2000 | Gooch et al. | 360/318 |
| 6,077,586 | A | 6/2000 | Bian et al. | 428/65.3 |
| 6,280,813 | B1 | 8/2001 | Carey et al. | 428/65.3 |
| 6,440,589 | B1 | 8/2002 | Fullerton et al. | 428/694 |
| 6,602,612 | B2 | 8/2003 | Abarra et al. | 428/611 |
| 6,645,614 | B1 | 11/2003 | Girt et al. | 428/336 |
| 6,773,834 | B2 * | 8/2004 | Do et al. | 428/828 |
| 6,777,112 | B1 | 8/2004 | Girt et al. | 428/694 |
| 6,811,890 | B1 * | 11/2004 | Zhou et al. | 428/828.1 |
| 6,852,426 | B1 * | 2/2005 | Girt et al. | 428/611 |

(Continued)

FOREIGN PATENT DOCUMENTS

JP          63048611         3/1988

(Continued)

OTHER PUBLICATIONS

T. Gouke et al., "Noise Property of Co-Cr-Pt-B Longitudinal Recording Media Separated by a Ru/Co-Cr/Ru Exchange-Coupling Layer", J.Mag.Soc.Jap vol. 28 No. 6, pp. 797-801.

(Continued)

*Primary Examiner*—Kevin M Bernatz
(74) *Attorney, Agent, or Firm*—Kunzler & McKenzie

(57) ABSTRACT

A laminate structure is disclosed comprising multiple ferromagnetic layers achieving incoherent reversal while maintaining good SNR. A high magnetic moment density, low anisotropy field material may form a thin overlayer deposited over a high-anisotropy media layer. The media layer may have a lower magnetic moment density than the overlayer and have decoupled magnetic grains. A coupling layer may be interposed between the overlayer and the media layer to modulate the exchange there between, thereby reducing the pass-through of noise while still promoting incoherent reversal to achieve reduced write energy requirements.

16 Claims, 3 Drawing Sheets

U.S. PATENT DOCUMENTS

| | | | |
|---|---|---|---|
| 6,939,626 B2 * | 9/2005 | Tang | 428/811.2 |
| 7,081,309 B2 * | 7/2006 | Do et al. | 428/828.1 |
| 7,149,045 B1 * | 12/2006 | Mallary et al. | 360/55 |
| 2001/0009727 A1 * | 7/2001 | Akimoto et al. | 428/694 T |
| 2002/0160230 A1 * | 10/2002 | Yoshikawa et al. | 428/694 T |
| 2003/0134150 A1 | 7/2003 | Hong et al. | 428/692 |
| 2003/0152805 A1 * | 8/2003 | Bertero et al. | 428/692 |
| 2003/0170500 A1 * | 9/2003 | Shimizu et al. | 428/694 TM |
| 2004/0166371 A1 | 8/2004 | Berger et al. | 428/694 |
| 2005/0053803 A1 * | 3/2005 | Umeda et al. | 428/694 T |

FOREIGN PATENT DOCUMENTS

| | | |
|---|---|---|
| JP | 3160615 | 7/1991 |
| JP | 2000322724 | 11/2000 |
| WO | WO-93/12928 * | 7/1993 |

OTHER PUBLICATIONS

J.P. Wang et al., "Anti-Ferromagnetic Coupling Effects on Energy Barrier and Reversal Properties of Recording Media", IEEE MAG vol. 37 No. 4, pp. 1445-1448.

* cited by examiner

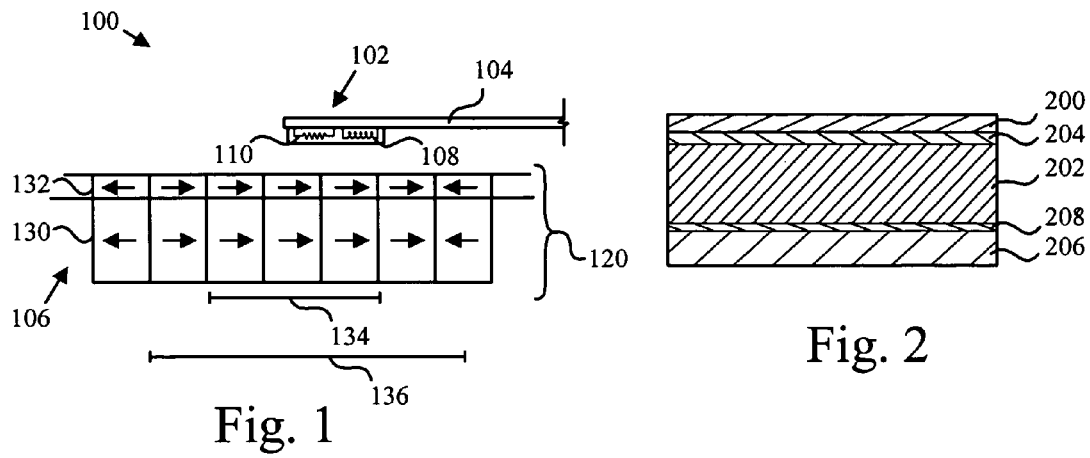
Fig. 1
Fig. 2
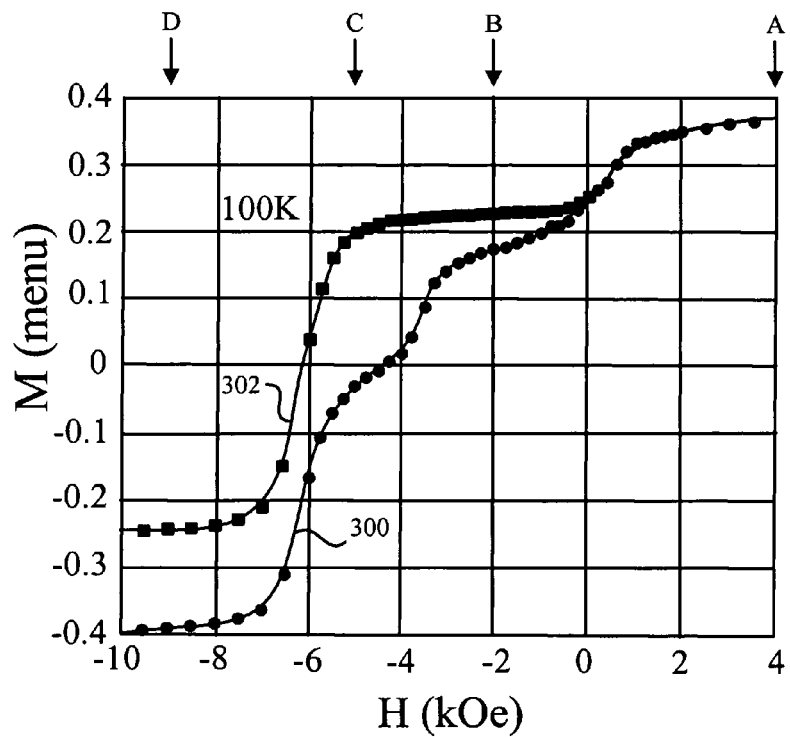
Fig. 3

INCOHERENTLY-REVERSING MAGNETIC LAMINATE WITH EXCHANGE COUPLED FERROMAGNETIC LAYERS

BACKGROUND OF THE INVENTION

1. Field of the Invention

This invention relates generally to laminate magnetic thin films for data recording and more particularly to magnetic thin films having multiple ferromagnetic layers.

2. Description of the Related Art

FIG. 1 illustrates a typical head and disk system 100 including a magnetic transducer 102 supported by a suspension 104 as it flies above the disk 106. The magnetic transducer 102, usually called a "read/write head" or "slider," may include elements that perform the task of writing magnetic transitions (the write head 108) and reading the magnetic transitions (the read head 110). The electrical signals to and from the read and write heads 110, 108 travel along conductive paths (leads), which are attached to or embedded in the suspension 104. The magnetic transducer 102 is positioned over points at varying radial distances from the center of the disk 106 to read and write circular tracks. The disk 106 comprises a substrate on which a laminate 120 having multiple layers is deposited. The laminate 120 may include ferromagnetic layers in which the write head 108 records the magnetic transitions in which information is encoded.

Extremely small regions, or bits, on the ferromagnetic layers are selectively magnetized in chosen directions in order to store data on the disk 106. The orientation of the magnetic moments of the magnetized regions is typically longitudinal. That is, the magnetic moments typically point along the plane of the laminate, rather than out of the plane. To increase the amount of data that can be stored on the disks 106 the number of bits per unit area, or storage density, must be increased.

As the storage density of magnetic recording disks has increased, the product of the remanent magnetic moment density ($M_r$) (the amount of magnetic moments per unit volume of ferromagnetic materials) and the magnetic layer thickness t has decreased. Similarly, values of coercivity (Kc) and anisotropy (Ku) have also increased. However, the extent to which $M_r t$ may be decreased and $K_c$ and $K_u$ may be increased is limited.

To achieve the reduction in $M_r t$, the thickness t of the magnetic layer has been reduced. However, as t is reduced, the magnetic layer exhibits increasing magnetic decay, attributed to thermal activation of small magnetic grains (the superparamagnetic effect). The thermal stability of a magnetic grain is to a large extent determined by $K_u V$, where $K_u$ is the magnetic anisotropy constant of the layer and V is the volume of the magnetic grain. As the layer thickness is decreased, V decreases. If the layer thickness is too thin, the stored magnetic information will no longer be stable at normal disk drive operating conditions. One possible solution to these limitations is to increase the intergranular exchange, so that the effective magnetic volume V of the magnetic grains is increased. However, this approach has been shown to be deleterious to the intrinsic signal-to-noise ratio (SNR) of the magnetic layer.

Increasing the values of $K_c$ and $K_u$ increases the amount of energy required to write data to the recording disk. However, write-energy requirements may not exceed the capacity of currently available write heads 108. The amount of write field required to write to a magnetic film is given by the coercive field $H_C$ which is proportional to the anisotropy field $H_K$ (approximately equal to $K_u/M_S$ for longitudinal recording media where $M_S$ is the saturation magnetization).

It is known that the write-energy requirements of a high anisotropy field and high coercivity field magnetic layers 130 may be decreased by depositing a layer 132 of thin, high magnetic moment density material with a lower $H_K$. This high moment material is closer to the write head and more effectively couples the write field and for the proper thicknesses and materials choices can achieve "incoherent reversal." Incoherent reversal results where the high-moment layer changes its orientation in response to an applied field and is no longer collinear with the higher anisotropy layers (130) and in turn amplifies the "torque," or reverse field, exerted on the high-anisotropy field layer, causing it to change orientation in response to a weaker applied field than would suffice in the absence of the high-moment layer.

The high-moment layer is magnetically "soft" and can more readily change the orientation of its magnetic moment when a write-field is applied compared to the high anisotropy layer. The change in orientation of the high moment layer causes the magnetic moment of the high-anisotropy field layer to change its orientation slightly, due to the direct exchange between the two layers. It is known that for high-anisotropy field materials, the energy required to cause a change in orientation of the magnetic moments is greatest where the applied field is exactly opposite current orientation. Accordingly, the high-moment layer, by inducing the magnetic moment of the high-anisotropy field layer to shift from a direction directly opposed to the write field, reduces the amount of energy required to cause the high-anisotropy layer to reverse.

The high-moment layer also enables more effective reading and writing to the laminate by concentrating large number of magnetic moments at the top of the media. It is known that reading and writing performance increases with proximity of the transducer 102 to the media. Accordingly, the high-moment layer, due to its direct exchange coupling with the high-anisotropy layer, effectively places the signal, or stored information, in the uppermost layer of the laminate increasing the read back signal and resolution.

Prior systems attempting to achieve the benefits of a high-moment overlayer have significant drawbacks. The high-moment layers tend to have a great deal of intergranular exchange which leads to increased noise and reduced storage density. When the write head 108 applies a field causing the grains in a region 134 to transition, intergranular exchange, will cause the adjoining grains to transition. Accordingly, a larger region 136 will be affected by the write field, thereby increasing the media noise and reducing storage density. SNR is also reduced as writing one bit causes unwanted changes in adjoining bits.

In prior systems, this intergranular exchange in the high-moment layer also affects the high-anisotropy layer. The high-anisotropy layer typically also has a low $M_r t$ and decoupled grains, which tend to reduce noise due to intergranular exchange. However, imposing a high-moment layer on the high-anisotropy field layer results in the noise of the high-moment layer being passed to the high-anisotropy layer.

In view of the foregoing, it would be an advancement in the art to provide a thin film magnetic laminate achieving incoherent reversal while avoiding a reduction in SNR or storage density. It would be an advancement in the art to provide such a film for use in commonly used longitudinal recording media.

SUMMARY OF THE INVENTION

The present invention has been developed in response to the present state of the art, and in particular achieves incoherent reversal of multilayer magnetic laminates while maintaining or increasing SNR. In some embodiments, a laminate 120 may include a thin overlayer located closest to the magnetic transducer 102, a media layer located beneath the upper magnetic layer, and an antiferromagnetic slave layer beneath the media layer. A coupling layer may be disposed between the overlayer and the media layer and serve to modulate the magnetic exchange between the upper and lower ferromagnetic layers. An antiferromagnetic coupling layer may be disposed between the lower ferromagnetic layer and the antiferromagnetic slave layer and serve to antiferromagnetically couple the lower ferromagnetic layer and the antiferromagnetic slave layer.

The media layer may comprise a magnetic alloy having either a high anisotropy field, decoupled grains, or both. The overlayer may comprise a material having either a high magnetic moment density, a relatively low anisotropy field, or both. The coupling layer may comprise either a ferromagnetically coupling material, a weakly ferromagnetic material, or a paramagnetic material. The coupling layer permits exchange between the overlayer and media layer, however, the exchange may be weaker than direct exchange as when the overlayer is deposited directly onto the media layer.

In the illustrated embodiment, the coupling layer is a CoCr alloys or CoRu alloy. CoCr alloys may have the composition s $Co_{100-x}Cr_x$, where $26<x<40$. CoRu alloys may have the composition $Co_{100-x}Ru_x$, where $25<x<70$. The overlayer may be embodied as a CoCrB or CoCr alloy. CoCrB alloys may have the composition $CoCr_xB_y$ where $0<x<20$ and $0<y<15$. CoCr alloys may have the composition $Co_{100-x}Cr_x$ where $0<x<20$.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 1 is a schematic representation of one embodiment of a read/write head and recording medium comprising a laminate magnetic thin film;

FIG. 2 is an illustration of one embodiment of the layer structure of a laminate magnetic thin film medium, in accordance with the present invention;

FIG. 3 is a hysteresis loop of a laminated magnetic thin film medium, in accordance with the present invention;

DETAILED DESCRIPTION OF THE INVENTION

Figure 4A:
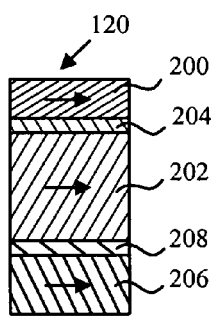
FIGS. 4A-4D are schematic representations of the various layers of a laminated magnetic thin film, in accordance with the present invention, having the orientation of the magnetic moments of the various layers illustrated for various points on the hysteresis loop.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Referring to FIG. 2, a laminate 120 may include an overlayer 200, a media layer 202, and a coupling layer 204. In some embodiments, the media layer 202 may be antiferromagnetically coupled to an antiferromagnetic slave layer 206 by means of an antiferromagnetically coupling layer 208.

The overlayer 200 may have a higher magnetic moment density ($M_r$) than the lower magnetic layer 202. In some embodiments, the overlayer 200 has a magnetic moment density of approximately 500-1500 emu/cm$^3$, whereas the media layer has a magnetic moment density of 100-500 emu/cm$^3$.

The overlayer 200 may also have a lower magnetic anisotropy field ($H_k$) than the media layer 202. In some embodiments, the anisotropy field of the overlayer 200 is less than half the anisotropy field of the media layer 202. The anisotropies ($K_u$) of the overlayer 200 and media layer 201 may be identical. However, the anisotropy field $H_k$ (approximately equal to $K_u/M_r$) of the overlayer 200 may be lower than that of the media layer 202 due to its higher $M_r$. In terms of writability, the value $H_k$ typically determines the strength of the magnetic field required to cause a change in orientation.

The overlayer may have various embodiments. In one embodiment a CoCrB alloys having the composition $CoCr_xB_y$, where $0<x<20$ and $0<y<15$ is used. In others, a CoCr alloy having the composition $Co_{100-x}Cr_x$, where $0<x<20$ may be used. Various other metals and metal alloys having high magnetic moments and low anisotropies may be used. In the illustrated embodiment the overlayer 200 has a thickness of less than five nanometers.

Due to its lower anisotropy field ($H_k$), the overlayer 200 is magnetically "soft" and the orientation of its magnetic moments is readily changed by an applied field from the write head 108. The change in orientation of the overlayer 200 causes the magnetic moment of the media layer 202 to change its orientation slightly, due to coupling between the two layers 200,202 via the coupling layer 204. For high-anisotropy materials, the energy required to cause a change in orientation of the magnetic moments is greatest where the applied field is exactly opposite the current orientation. Accordingly, the overlayer 200, by inducing the magnetic moment of the high-anisotropy media layer 202 to shift from a direction directly opposed to the write field, reduces the amount of energy required to cause the media layer 202 to transition.

The overlayer 200 also enables more effective reading and writing to the laminate by concentrating large number of magnetic moments at the top of the laminate 120. Reading and writing performance increases with the proximity of the transducer 102 to the stored signal. Accordingly, the overlayer 200, due to its coupling with the media layer 202, effectively places the signal, or stored information, in the uppermost layer of the laminate. Since the overlayer is a higher moment alloy, the signal originated from an effectively thinner layer than if it were distributed over a much thicker recoding alloy.

The media layer 202 is typically made of a high anisotropy field material that may also be chosen for decoupling of the magnetic grains within the media. In the illustrated embodiment, the media layer 202 is a CoPtCrB alloy. Other ferromagnetic alloys having suitable anisotropy fields, decoupling, and magnetic moment densities may also be used for the media layer 202.

The coupling layer 204 may be used to reduce the deleterious effects of a high-moment overlayer 200. As discussed hereinabove, a high-moment, low anisotropy field material is subject to lateral exchange between magnetic grains leading to increased noise and decreased storage density. A coupling layer 204 may modulate the exchange between the overlayer 200 and the media layer 202 to inhibit the transfer of noise to the media layer 202. The coupling of the layers 200,202 may be weaker than for direct exchange, thereby reducing the transfer of noise from the overlayer 200 to the media layer 202. Various types of coupling means may be used. For example, the coupling layer 204 may be a nonmagnetic material having a thickness tuned to achieve ferromagnetic coupling. The coupling layer 204 may also be a paramagnetic material or a weakly ferromagnetic layer.

The coupling layer 204 may be formed of various materials known to effectively ferromagnetically couple magnetic layers. For example, a ruthenium layer having a thickness tuned to cause ferromagnetic coupling may be used. In the illustrated embodiment, a CoRu alloy or CoCr alloy having a thickness and composition chosen to achieve ferromagnetic coupling are used. CoRu alloys having the composition $Co_{100-x}Ru_x$, where $25<x<70$ may be used. CoCr alloys having the composition $Co_{100-x}Cr_x$, where $26<x<40$ may also be used. The coupling layer may have a thickness of less than four nanometers (nm).

The antiferromagnetic slave layer 206 maybe composed of a material suitable for use in antiferromagnetic media, such as $CoCr_{11}$. The antiferromagnetically coupling layer 208 is typically formed of ruthenium having a thickness chosen to achieve antiferromagnetic coupling.

The hysteresis loop of FIG. 3 demonstrates the embodiment of the laminate of FIG. 2. The measurements shown in FIG. 3 reflect a laminate having a coupling layer 204 formed of a CoRu alloy and is measured from large positive fields to large negative fields. The loop reflects the change in the number of magnetic moments having a particular orientation, also referred to as saturation, as a reversing field of increasing magnitude is applied to the laminate. The curve 300 represents the major loop, indicating the magnetization in the presence of an applied field. The curve 302 represents the remanent magnetization of the laminate 120 after the applied field is removed. FIGS. 4A through 4D illustrate the orientation of the magnetic moments within each layer 200,202,206 at points A through D on the hysteresis loop.

Figure 4B:
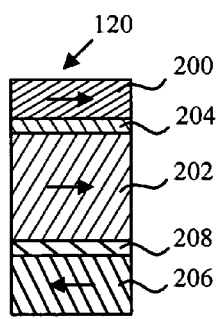
Figure 4C:
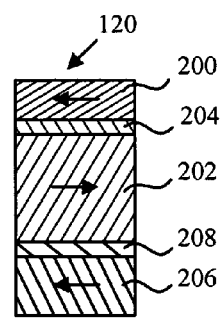
Figure 4D:
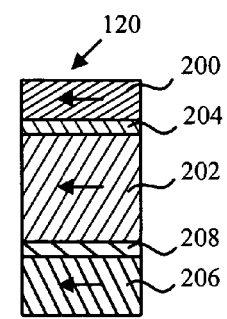

At point A the magnetic moments of each layer 200,202, 206 are at positive saturation oriented in the same direction in an applied field of 4 kOe. As the applied field is reduced to zero, the antiferromagnetic slave layer 206 reverses as shown in FIG. 4B as a result of the antiferromagnetic coupling between itself and the media layer 202. At point C, approximately 3.5 kOe, the overlayer 200 reverses direction due to the applied field as shown in FIG. 4C. At point D, the media layer reaches negative saturation, as shown in FIG. 4D.

The remanent curve does not reflect the reversal of the overlayer 200 after point C. To the right of point C, the remanent curve 302 has much higher positive saturation than the major loop 300 because the media layer 202 has not reversed at this point and therefore switches the orientation of the overlayer 200 as soon as the applied field is removed, due to the coupling between the layers 200,202. The remanent curve also reflects the reversal of the antiferromagnetic slave layer 206 when the applied field is removed at point D: the negative saturation of the remanent curve 302 is less than the major loop because the antiferromagnetic slave layer 206 reverses direction in the absence of an applied field due to its antiferromagnetic coupling to the media layer 202.

Referring to FIGS. 5A-5E, measurements of indicia used to evaluate recording performance clearly indicate improved overall performance through the use of a coupling layer 204 modulating the exchange between the layers 200,202. The values in column 600 represent measurements of a media layer 202 without an overlayer 200 or coupling layer 204. The values in column 602 represent measurements of a media layer 202 with an overlayer 200 but without a coupling layer 204. The values in columns 604-610 represent measurements of media layers 202 with an overlayer 200 and coupling layers 204 of increasing thicknesses. The thickness of the coupling layer 204 increases from right to left.

Figure 5A:
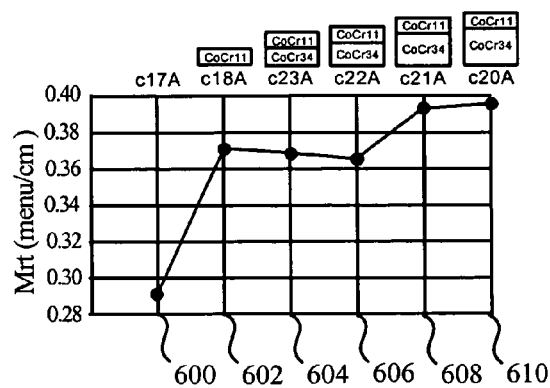
FIGS. 5A-5D are plots representing measurements of indicia used to evaluate the performance of a recording medium.

Referring to FIG. 5A, it is clear that the $M_r t$ of columns 602-610 is greater than for the laminate of column 600, which does not have an overlayer 202 or coupling layer 204. This demonstrates the composite magnetization of the media increases as the high moment over is added.

Figure 5B:
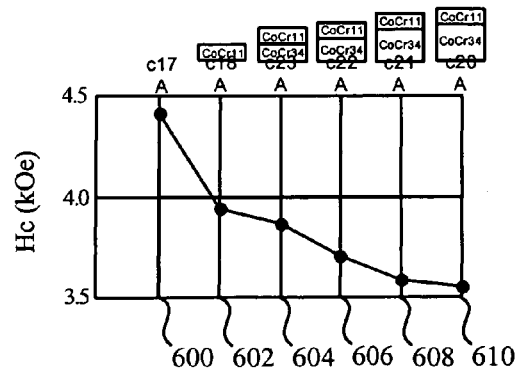

Referring to FIG. 5B, smaller values for $H_c$ correspond to smaller write-energy requirements. It is clear from column 602 that the addition of an overlayer 200 reduces $H_c$. It is also clear from columns 604-610 that adding a coupling layer 204 and increasing the thickness of the coupling layer 204 further reduce $H_c$. It will be noted that the measurements of FIG. 6B are of the effective $H_c$ of the entire laminate 120. However, the composition of the media layer 202 and the $H_c$ of the media layer 202 are unchanged. Accordingly, the thermal stability of the media layer 202 is not affected, whereas the writability of the laminate 120 improves with the addition of an overlayer 202 and a coupling layer 204.

Figure 5C:
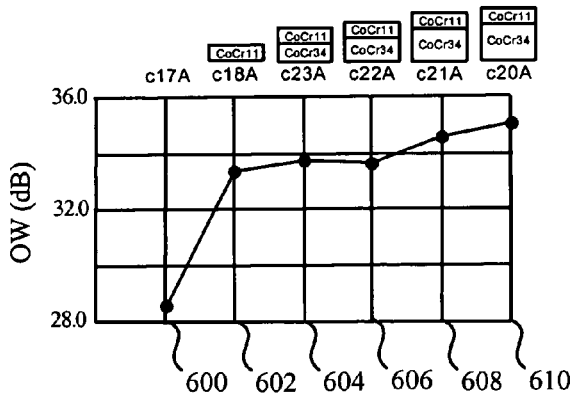

Referring to FIG. 5C, use of an overlayer 200 and coupling layer 204 also increases the ability of the laminate 120 to be overwritten. As shown by column 602 an overlayer 200 increases overwrite (OW) performance. As shown by columns 604-610, adding a coupling layer further increases OW with further gains being achieved with increased thickness of the coupling layer 204.

Figure 5D:
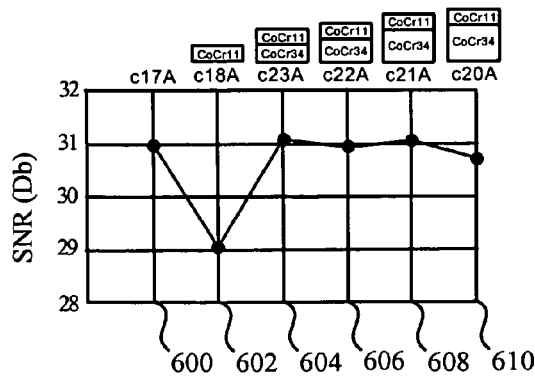

The above mentioned gains in OW performance are all accomplished without a reduction in SNR where a coupling layer 204 is used as shown in FIG. 5D. Column 602 indicates an increase in noise where an overlayer 202 is added without a coupling layer 204 to modulate the exchange between the overlayer 202 and the media layer 204. Columns 604-610 clearly show that SNR is improved where a coupling layer 204 is interposed between the layers 200,202.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A laminate recording medium comprising:
   an upper magnetic layer having a first thickness, a first magnetic anisotropy field, and a first magnetic moment density, the upper magnetic layer comprising magnetic grains;
   a lower magnetic layer having a second thickness, a second magnetic anisotropy field, and a second magnetic moment density, the second magnetic anisotropy field being greater than the first anisotropy and the first magnetic moment density being higher than the second magnetic moment density, the lower layer comprising magnetic grains, the magnetic grains of the lower layer having a greater degree of decoupling than the magnetic grains of the upper layer; and
   a coupling layer disposed between the upper and lower layers, the coupling layer being a material chosen from the group consisting of ferromagnetically coupling materials.

2. The laminate of claim 1, wherein the upper layer has a magnetic moment density of about 500 to 1500 emu/cm^3 and wherein the lower layer has a magnetic moment density of about 100 to 500 emu/cm^3.

3. The laminate of claim 2, wherein the first anisotropy field is less than half the second anisotropy field.

4. The laminate of claim 1, wherein the coupling layer is a ferromagnetically coupling material ferromagnetically coupling the upper and lower magnetic layers.

5. The laminate of claim 1, wherein the coupling layer has a thickness less than four nanometers.

6. The laminate of claim 1, wherein the second magnetic anisotropy field is longitudinally oriented.

7. The laminate of claim 1, wherein the second thickness is greater than the first thickness.

8. The laminate of claim 7, wherein the first thickness is less than five nanometers.

9. A laminate comprising:
   an upper layer having a first thickness, a first anisotropy, and a first magnetic moment density, the upper layer comprising magnetic grains;
   a lower layer having a second thickness, a second anisotropy, and a second magnetic moment density, the first magnetic moment density being greater than the second magnetic moment density, the lower layer having the magnetic moments thereof oriented longitudinally, the lower layer comprising magnetic grains, the magnetic grains of the lower layer having a greater degree of decoupling than the magnetic grains of the upper layer; and
   a coupling layer disposed between the upper and lower layers.

10. The laminate of claim 9, wherein the coupling layer ferromagnetically couples the upper and lower layers.

11. The laminate of claim 9, wherein the second thickness is greater than the first thickness.

12. A recording device comprising:
   a transducer for inducing and detecting magnetic fields;
   a rotatable medium comprising
      an upper layer positioned proximate the transducer head, the upper layer comprising magnetic grains,
      a lower layer positioned beneath the upper layer, the lower layer comprising magnetic grains, the magnetic grains of the lower layer having a greater degree of decoupling than the magnetic grains of the upper layer, and
      a coupling layer modulating magnetic exchange between the upper and lower layer,
      the upper layer having a higher magnetic moment density and a lower anisotropy than the lower layer, the anisotropy of the lower layer being oriented longitudinally.

13. The recording device of claim 12, further comprising:
   a slave layer positioned beneath the lower layer; and
   an antiferromagnetic coupling layer disposed between the slave layer and the lower layer.

14. The recording device of claim 12, wherein the upper layer comprises an alloy chosen from the group of CoCrB alloys and other CoCr alloys.

15. The recording device of claim 14, wherein the upper layer is $CoCr_xB_y$ where $0<x<20$ and $0<y<15$.

16. The recording device of claim 14, wherein the upper layer is $Co_{100-x}Cr_x$ where $0<x<20$.

* * * * *